United States Patent
Sharma et al.

(10) Patent No.: US 11,811,729 B1
(45) Date of Patent: Nov. 7, 2023

(54) SYSTEM AND METHOD FOR CONFIGURING INTERNET PROTOCOL DEVICE

(71) Applicant: Shanghai United Imaging Intelligence Co., LTD., Shanghai (CN)

(72) Inventors: Abhishek Sharma, Cambridge, MA (US); Arun Innanje, Cambridge, MA (US); Ziyan Wu, Cambridge, MA (US); Terrence Chen, Cambridge, MA (US)

(73) Assignee: Shanghai United Imaging Intelligence Co., LTD., Xuhui District (CN)

( * ) Notice: Subject to any disclaimer, the term of this patent is extended or adjusted under 35 U.S.C. 154(b) by 0 days.

(21) Appl. No.: 17/889,480

(22) Filed: Aug. 17, 2022

(51) Int. Cl.
*G06F 15/16* (2006.01)
*H04L 61/5046* (2022.01)
*H04L 61/5038* (2022.01)
*H04L 61/5014* (2022.01)

(52) U.S. Cl.
CPC ...... *H04L 61/5046* (2022.05); *H04L 61/5014* (2022.05); *H04L 61/5038* (2022.05)

(58) Field of Classification Search
None
See application file for complete search history.

(56) References Cited

U.S. PATENT DOCUMENTS

| | | | | |
|---|---|---|---|---|
| 6,118,768 A * | 9/2000 | Bhatia | ................ | H04Q 11/0471 370/254 |
| 6,587,455 B1 * | 7/2003 | Ray | ................... | H04L 61/5014 709/227 |
| 6,957,276 B1 * | 10/2005 | Bahl | ................... | H04L 61/5014 709/227 |
| 7,231,660 B1 * | 6/2007 | Daude | ................ | H04L 61/5014 726/4 |
| 2005/0271049 A1 * | 12/2005 | Jain | ........................ | H04L 61/59 370/389 |
| 2006/0195610 A1 * | 8/2006 | Cole | ................... | H04L 63/1491 709/245 |
| 2007/0083748 A1 * | 4/2007 | Erickson | ............... | G06F 9/4416 713/2 |
| 2007/0237141 A1 * | 10/2007 | Marchese | ............... | H04L 41/12 370/389 |

(Continued)

FOREIGN PATENT DOCUMENTS

WO     2006132142 A1     12/2006

*Primary Examiner* — Phyllis A Book
(74) *Attorney, Agent, or Firm* — ZIEGLER IP LAW GROUP LLC

(57) ABSTRACT

Disclosed is a system and a method for configuring an IP device to be discoverable to a client device over a local network having a DHCP server for assigning dynamic IP addresses. The method includes obtaining a dynamic IP address assigned to the IP device upon completion of boot process for the IP device; checking if a static IP address has been set for the IP device; determining if the dynamic IP address and the static IP address are in a same subnet of the local network; implementing the static IP address set for the IP device, if the dynamic IP address and the static IP address are in the same subnet of the local network; and implementing the dynamic IP address assigned to the IP device, if the dynamic IP address and the static IP address are not in the same subnet of the local network.

20 Claims, 2 Drawing Sheets

(56) References Cited

U.S. PATENT DOCUMENTS

2008/0147830 A1\* 6/2008 Ridgill .................... H04L 67/34
                                                          709/222
2011/0072120 A1\* 3/2011 Guo .................... H04L 61/5014
                                                          709/222

\* cited by examiner

SYSTEM AND METHOD FOR CONFIGURING INTERNET PROTOCOL DEVICE

TECHNICAL FIELD

The aspects of the disclosed embodiments relate to internet protocol devices; and more specifically to a system and method for configuring an Internet Protocol (IP) device to be discoverable to a client device over a local network.

BACKGROUND

Internet protocol (IP) devices, such as an IP camera, needs to be connected over a network to allow a client to access a video feed therefrom. Each IP camera over the network is provided with an IP address which is a unique identifier to allow for accessing the respective video feed. Typically, the IP camera needs either manual intervention to set a specific static IP address or the IP camera automatically gets a dynamic IP address over the network. For instance, once the IP camera may be connected to the network using a wired connection (such as a LAN cable) or wireless network (by inputting wireless network credentials), a Dynamic Host Configuration Protocol (DHCP) server of the network may assign a dynamic IP address to the IP camera. Sometimes, the client may wish (or need) to set a static IP address for the IP camera, so that the client knows the IP address of the camera over the network at any given instant for reliable connection, such as to be able to easily access the IP camera from a client device (for example, by simply entering the set static IP address as URL in a browser of the client device or the like).

For setting the static IP address for the IP camera, a network configuration needs to be performed, which is generally not possible to be done solely with the IP camera, but is typically done with a specific application installed in a separate personal computer (PC). The network configuration for the IP camera includes settings of the IP camera, such as the preferred static IP address of the IP camera, a gateway address, a subnet mask, and a domain name server address. During the network configuration process, if the client mistakenly inputs incorrect configuration parameters, like providing a static IP address which is outside of subnet address for the network, then the IP camera may become unreachable. Typically, in such a scenario, a physical connection to the IP camera is required either using a network cable or a config cable to recover from such incorrect network configuration state. For instance, the IP camera may need to be reset to again be assigned a dynamic IP address and then the entire network configuration process needs to be re-performed.

Therefore, in light of the foregoing discussion, there exists a need to overcome the aforementioned drawbacks associated with existing IP cameras, and provide a workflow to make network configuration for the IP cameras easier and recoverable for cases, like when user sets a static IP address which is outside the subnet address and then the IP camera becoming unreachable.

SUMMARY

The aspects of the disclosed embodiments seek to provide a system for configuring an Internet Protocol (IP) device to be discoverable to a client device over a local network. The aspects of the disclosed embodiments also seek to provide a method for configuring an Internet Protocol (IP) device to be discoverable to a client device over a local network. The aspects of the disclosed embodiments further seek to provide an Internet Protocol (IP) device configured to be discoverable to a client device over a local network. An aim of the disclosed embodiments is to provide a solution that overcomes at least partially the problems encountered in existing IP devices and provide a workflow to make network configuration for the IP devices easier and recoverable for cases, like when user sets a static IP address which is outside the subnet address and then the IP device becoming unreachable.

In one aspect, an embodiment of the present disclosure provides a system for configuring an Internet Protocol (IP) device to be discoverable to a client device over a local network, the local network having a Dynamic Host Configuration Protocol (DHCP) server for assigning dynamic IP addresses. The system comprises a boot controller for the IP device, the boot controller configured to generate a boot signal upon completion of boot process for the IP device. The system further comprises an IP address controller for the IP device. The IP address controller is configured to obtain a dynamic IP address assigned to the IP device by the DHCP server, in response to the boot signal from the boot controller. The IP address controller is further configured to check if a static IP address has been set for the IP device. The IP address controller is further configured to determine if the dynamic IP address and the static IP address are in a same subnet of the local network. The IP address controller is further configured to implement the static IP address set for the IP device, if the dynamic IP address and the static IP address are in the same subnet of the local network. The IP address controller is further configured to implement the dynamic IP address assigned to the IP device, if the dynamic IP address and the static IP address are not in the same subnet of the local network.

In another aspect, an embodiment of the present disclosure provides a method for configuring an Internet Protocol (IP) device to be discoverable to a client device over a local network, the local network having a Dynamic Host Configuration Protocol (DHCP) server for assigning dynamic IP addresses. The method comprises obtaining a dynamic IP address assigned to the IP device upon completion of boot process for the IP device. The method further comprises checking if a static IP address has been set for the IP device. The method further comprises determining if the dynamic IP address and the static IP address are in a same subnet of the local network. The method further comprises implementing the static IP address set for the IP device, if the dynamic IP address and the static IP address are in the same subnet of the local network. The method further comprises implementing the dynamic IP address assigned to the IP device, if the dynamic IP address and the static IP address are not in the same subnet of the local network.

In yet another aspect, an embodiment of the present disclosure provides an Internet Protocol (IP) device configured to be discoverable to a client device over a local network, the local network having a Dynamic Host Configuration Protocol (DHCP) server for assigning dynamic IP addresses. The IP device comprises a boot controller configured to generate a boot signal upon completion of boot process for the IP device. The IP device further comprises an IP address controller. The IP address controller is configured to obtain a dynamic IP address assigned to the IP device by the DHCP server, in response to the boot signal from the boot controller. The IP address controller is further configured to check if a static IP address has been set for the IP device. The IP address controller is further configured to determine if the dynamic IP address and the static IP address are in a same subnet of the local network. The IP address controller is further configured to implement the static IP address set for the IP device, if the dynamic IP address and the static IP address are in the same subnet of the local network. The IP address controller is further configured to implement the dynamic IP address assigned to the IP device, if the dynamic IP address and the static IP address are not in the same subnet of the local network.

Embodiments of the present disclosure substantially eliminate or at least partially address the aforementioned problems in the prior art and provide an improved method for passivating a cleaved semiconductor substrate for utilization as an edge-emitting laser.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
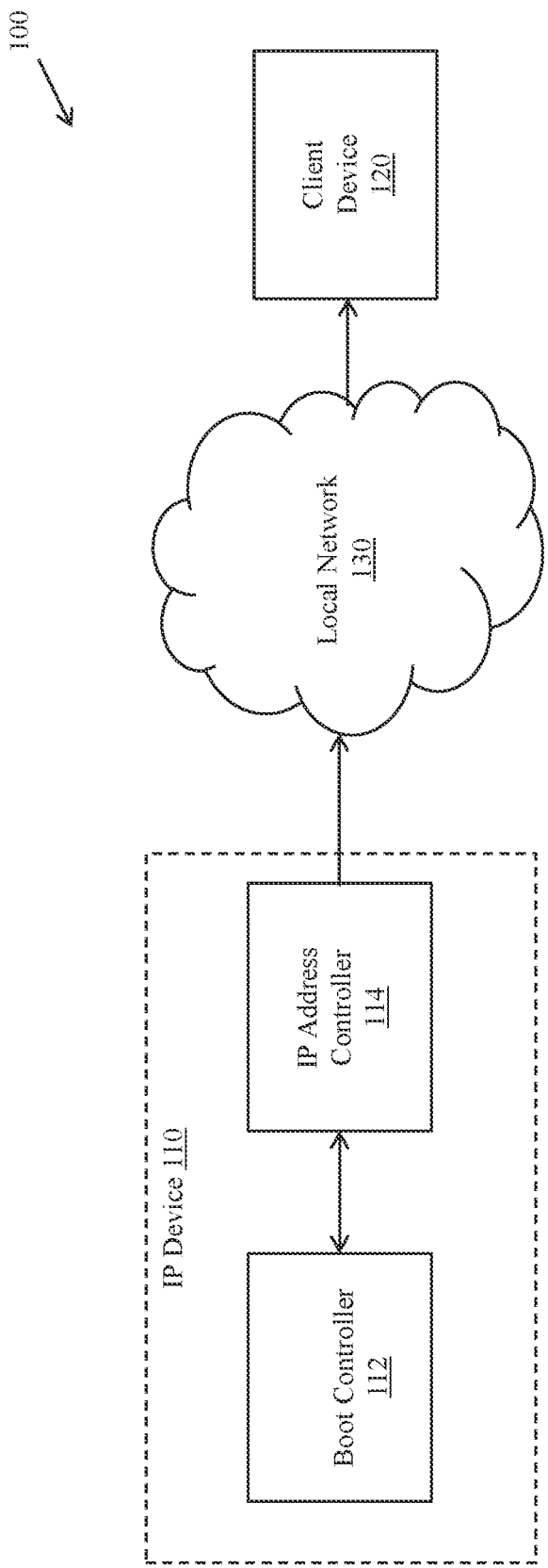
FIG. 1 is a schematic diagram of a system for configuring an Internet Protocol (IP) device to be discoverable to a client device over a local network, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for configuring an Internet Protocol (IP) device to be discoverable to a client device over a local network, the local network having a Dynamic Host Configuration Protocol (DHCP) server for assigning dynamic IP addresses. The system comprises a boot controller for the IP device, the boot controller configured to generate a boot signal upon completion of boot process for the IP device. The system further comprises an IP address controller for the IP device. The IP address controller is configured to obtain a dynamic IP address assigned to the IP device by the DHCP server, in response to the boot signal from the boot controller. The IP address controller is further configured to check if a static IP address has been set for the IP device. The IP address controller is further configured to determine if the dynamic IP address and the static IP address are in a same subnet of the local network. The IP address controller is further configured to implement the static IP address set for the IP device, if the dynamic IP address and the static IP address are in the same subnet of the local network. The IP address controller is further configured to implement the dynamic IP address assigned to the IP device, if the dynamic IP address and the static IP address are not in the same subnet of the local network.

In another aspect, an embodiment of the present disclosure provides a method for configuring an Internet Protocol (IP) device to be discoverable to a client device over a local network, the local network having a Dynamic Host Configuration Protocol (DHCP) server for assigning dynamic IP addresses. The method comprises obtaining a dynamic IP address assigned to the IP device upon completion of boot process for the IP device. The method further comprises checking if a static IP address has been set for the IP device. The method further comprises determining if the dynamic IP address and the static IP address are in a same subnet of the local network. The method further comprises implementing the static IP address set for the IP device, if the dynamic IP address and the static IP address are in the same subnet of the local network. The method further comprises implementing the dynamic IP address assigned to the IP device, if the dynamic IP address and the static IP address are not in the same subnet of the local network.

In yet another aspect, an embodiment of the present disclosure provides an Internet Protocol (IP) device configured to be discoverable to a client device over a local network, the local network having a Dynamic Host Configuration Protocol (DHCP) server for assigning dynamic IP addresses. The IP device comprises a boot controller configured to generate a boot signal upon completion of boot process for the IP device. The IP device further comprises an IP address controller. The IP address controller is configured to obtain a dynamic IP address assigned to the IP device by the DHCP server, in response to the boot signal from the boot controller. The IP address controller is further configured to check if a static IP address has been set for the IP device. The IP address controller is further configured to determine if the dynamic IP address and the static IP address are in a same subnet of the local network. The IP address controller is further configured to implement the static IP address set for the IP device, if the dynamic IP address and the static IP address are in the same subnet of the local network. The IP address controller is further configured to implement the dynamic IP address assigned to the IP device, if the dynamic IP address and the static IP address are not in the same subnet of the local network.

The aspects of the disclosed embodiments relate to configuring an Internet Protocol (IP) device. In particular, the aspects of the disclosed embodiments relate to configuring the IP device to be discoverable to a client device over a local network. The aspects of the disclosed embodiments make configuring the IP device fool-proof as compared to existing mechanisms and methods, even in case of the mistaken entry of IP address information and the like.

Referring to FIG. 1, illustrated is a schematic diagram of a system (generally referred by the reference numeral 100) for configuring an Internet Protocol (IP) device 110 to be discoverable to a client device 120 over a local network 130. The present disclosure has been described in terms of the IP device 110 being an IP camera (with the two terms being interchangeably used hereinafter). This is being done to facilitate describing embodiments of the proposed invention and not by way of limitation; and the present disclosure is equally applicable to any electronic device which needs to be configured to connect to the local network 130. As used herein, the Internet Protocol camera, or IP camera 110, is a type of digital video camera that receives control data and sends image data via the local network 130. The IP camera 110 may commonly be used for surveillance, but, unlike analog closed-circuit television (CCTV) cameras, it may not require local recording device. The term "IP camera," as used herein, may be applied to all digital cameras that may be directly accessed over a network connection. It will be appreciated by a person skilled in the art that the teachings of the present disclosure may be implemented to further configure an already configured electronic device (wired or wireless) to provide the device with further communication capabilities, such as the ability to communicate over the Internet (i.e., outside of the local network 130) and the like.

Also, as used herein, the term "client device" means a device including at least one processor that accesses a service available by remote processing system via a communication network (such as, the local network 130). Examples of the client device 120 include, but are not limited to, a workstation, a desktop computer, a mobile computer, a laptop computer, a netbook computer, a tablet computer, a smart phone, a personal digital assistant (PDA), and the like. Additionally, as used herein, the term "client" or "user" means a person (i.e., a human being).

Further, as used herein, the local network 130, generally, refers to a communication network primarily used by the client device 120. For example, if the client device 120 commonly is used to connect to a communication network providing communication services to a home of a user of the client device 120, such communication network is the local network 130. Similarly, if the client device 120 commonly is used to connect to a communication network providing communication services to a place of employment of a user of the client device 120, such communication network is the local network 130. It may be appreciated that the local network 130 provided in a public establishment, such as a cafe, restaurant, library, hotel, airport, arena, stadium or the like is not the local network 130 unless such public establishment is a place of employment of the client of the client device 120 connecting to such communication network.

In an example, the local network 130 is a local area network (LAN), which is a group of computers and peripheral devices that share a common communications line or wireless link to the client device 120, usually within a distinct geographic area. In other example, the local network 130 may also include a wide area network (WAN), which is a large network of information that may not be tied to a single geographical location, without departing from the spirit and the scope of the present disclosure. For purposes of explanation, the present disclosure describes the local network 130 to be a wired network connection (such as, an Ethernet connection), but it may be appreciated that the present disclosure is generally applicable to any type of local network which is capable of communicating or connecting the IP device 110 to the client device 120, for example, including wireless networks (such as a Wi-Fi network), or a combination of wired network and wireless network without any limitations. Such details and variations may be contemplated by a person having ordinary skill in the art and thus have not been described further for brevity of the present disclosure.

The IP device 110 may utilize a communication protocol to allow for communication with other devices, such as the client device 120, over the local network 130. One example of a standard protocol which may be provided in transport control protocol stack is TCP/IP, a connection-oriented protocol that offers error reporting, prioritizing of data, and retransmission of lost or erroneous packets. In such case, the TCP layer accepts and segments data streams, and passes the segments to the IP layer for routing, accepts segmented data from the IP layer, resolves error conditions, and re-sequences segments as necessary. Further, the IP layer routes segmented data, resolves error conditions, and presents data to the TCP layer for resequencing. Such TCP/IP protocol is more useful for reliable transmission of data that must be correct, e.g., transmission of specific still images, or for retrieval or reception of a configuration file, etc.

Alternatively, or in addition, a low-overhead protocol that provides no retransmission or error correction features may be used, e.g., packets containing image data or other data that fail an error check, e.g., a checksum or CRC (cyclic redundancy check), are discarded, and are not retransmitted. One candidate protocol is UDP/IP, which may be provided as part of the transport control protocol stack instead of or in addition to the protocol responsive to transmission errors (e.g., TCP/IP). Such UDP/IP protocol significantly reduces the overhead (e.g., a packet header contains less data) of the error-responsive protocols, and is useful for streaming images at the fastest possible rate. Accordingly, as described below, when the IP camera is set to stream images at the fastest possible rate, the camera may switch to a lower-overhead protocol (e.g., UDP/IP) provided as part of the transport control protocol stack.

Hereinafter, in all instances where error-responsive TCP/IP is used as an exemplary transport control protocol, TCP/IP may be replaced with a lower-overhead protocol such as UDP/IP, especially on a connection where loss of packets or data is acceptable (e.g., to reduce data overhead and increase image streaming rate). Either of error-responsive TCP/IP or lower-overhead UDP/IP may be replaced by a successor protocol (i.e., an Internet protocol that succeeds error-responsive TCP/IP or low-overhead UDP/IP as a standard).

For said communication protocols to be utilized, the IP device 110 needs to be provided with an IP address, which is a unique address that identifies the IP device 110 on the local network 130. Herein, the IP stands for "Internet Protocol," which is the set of rules governing the format of data sent over the local network 130. For such purposes, the local network 130 may include a Dynamic Host Configuration Protocol (DHCP) server 132 which is a network server that automatically provides and assigns IP addresses, default gateways and other network parameters to various devices connected to the local network 130. The DHCP server 132 relies on the standard protocol known as Dynamic Host Configuration Protocol or DHCP to respond to broadcast queries by the various devices connected to the local network 130. The DHCP server 132 assigns a non-duplicate dynamic IP address to the IP device 110. Herein, the DHCP server 132 may automatically allocate an IP address and a subnet address to the IP device 110 using a zero-configuration scheme that enables automatic setting of network configuration for the IP device 110. For example, if a valid IP address pool for the local network 130 is 192.168.1.1 to 192.168.1.255 and a default subnet address is 255.255.255.0, the DHCP server 132 may randomly assigns an IP address from the said valid IP address pool, say 192.168.1.241, with the subnet address as 255.255.255.0, to the IP device 110.

As per embodiments of the present disclosure, as also shown in FIG. 1, the IP device 110 includes a boot controller 112 and an IP address controller 114. The definition of the term "controller" as referred to herein are to be understood as constituting hardware circuitry such as a CCD, CMOS, SoC, AISC, FPGA, a processor or microprocessor (a controller) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and do not constitute software per se. In addition, the controllers described herein are hardware that are comprised of components, for example, a processor or microprocessor configured for operation by the algorithms shown in the flowcharts and described herein.

Alternatively, or additionally, the boot controller 112 and the IP address controller 114 may be in the form of software modules implemented in the IP device 110. The term "module" used herein may represent, for example, a unit including one or more combinations of hardware, software and firmware. The term "module" may be interchangeably used with the terms such as, for example, "component" and "circuit". The "module" may be a minimum unit of an integrated component or may be a part thereof. The "module" may be a minimum unit for performing one or more functions or a part thereof. The "module" may be implemented mechanically or electronically. According to various embodiments of the present disclosure, at least a part of devices (e.g., modules or functions thereof) or methods (e.g., operations) according to various embodiments of the present disclosure may be implemented as instructions stored in a computer-readable storage non-transitory medium in the form of a programming module.

Herein, the boot controller 112 is responsible for completing a boot process for the IP device 110. The boot process is basically the process of starting the IP device 110 when it is first switched on, and to load Operating System into a main memory thereof, so that the IP device 110 become ready for performing its operations. In the present configuration, the boot controller 112 is configured to enable DHCP for the IP device 110 to enable assignment of the dynamic IP address for the IP device 110 during the boot process thereof by the DHCP server 132 over the local network 130. That is, in the present implementation, the dynamic IP address for the IP device 110 is assigned thereto during the boot process itself. As used herein, the boot controller 112 is further configured to generate a boot signal upon completion of boot process for the IP device 110. Herein, the boot signal is indicative of completion of the boot process, and thereby represents that the dynamic IP address may have been assigned to the IP device 110 (provided the DHCP server 132 is reachable to allocate the dynamic IP address thereto).

In an embodiment, in case of no assignment of the dynamic IP address for the IP device 110 upon completion of the boot process, the boot controller 112 is configured to wait for a predefined wait time for assignment of the dynamic IP address for the IP device 110 by the DHCP server 132 before generating the boot signal. That is, if there is no dynamic IP address assigned to the IP device 110 upon completion of the boot process, the boot controller waits for the predefined wait time before confirming completion of the boot process, as in by generation the boot signal. In the present implementation, the predefined wait time varies between 5 seconds to 500 seconds. In an example, the predefined wait time is one of: 5 seconds, 50 seconds, 100 seconds, 200 seconds, 300 seconds, 400 seconds, or 500 seconds. It may be understood that the predefined wait time is utilized to ensure that there is sufficient time given for the DHCP server 132 to allot the dynamic IP address for the IP device 110, such as in case of and compensate for network connectivity issue and/or network congestion issue.

Further, the IP address controller 114 is responsible for ensuring proper allocation of the IP address for the IP device 110. For such purpose, first, the IP address controller 114 is configured to obtain the dynamic IP address assigned to the IP device 110 by the DHCP server 132, in response to the boot signal from the boot controller 112. That is, upon receiving the boot signal, which is indicative of completion of the boot process and likely assignment of the dynamic IP address to the IP device 110 by the DHCP server 132, the IP address controller 114 obtains the assigned dynamic IP address to the IP device 110. The IP address controller 114 is further configured to check if a static IP address has been set for the IP device 110. As discussed, sometimes the client may wish (or need) to set the static IP address for the IP device 110, so that the client knows the IP address of the IP device 110 over the local network 130 at any given instant for reliable connection, such as to be able to easily access the IP device 110 from the client device 120 (for example, by simply entering the set static IP address as URL in a browser of the client device 120 or the like). Therefore, in case, the static IP address has been set for the IP device 110, then the IP address controller 114 fetches the set static IP address therefor.

Thereafter, the IP address controller 114 is configured to determine if the dynamic IP address and the static IP address are in a same subnet of the local network 130. That is, it is checked whether the set static IP address for the IP device 110 is in the same subnet of the local network 130 as the assigned dynamic IP address thereto. As may be understood, the assigned dynamic IP address may always be in the correct subnet of the local network 130, since it is assigned by the DHCP server 132 of the local network 130; but it may be possible that the set static IP address for the IP device 110 may have been wrongly entered (while manual configuration of the IP device 110 by the client) and may possibly be outside of the subnet of the local network 130. For example, if a valid IP address pool for the local network 130 is 192.168.1.1 to 192.168.1.255, and the static IP address for the IP device 110 may have been set as 192.168.0.123 (while, e.g., the client may have wanted to enter 192.168.1.123 as the static IP address), in such case, the static IP address would be outside of the subnet of the local network 130. Now, if the IP device 110 may have used the wrongly set static IP address, then the IP device 110 would become unreachable to the client device 120 over the local network 130.

In the present implementation, the IP address controller 114 is configured to implement the static IP address set for the IP device 110, if the dynamic IP address and the static IP address are in the same subnet of the local network 130. That is, if the static IP address set for the IP device 110 is in the same subnet of the local network 130 as the assigned dynamic IP address by the DHCP server 132 therefor, then it may be considered that the set static IP address can be used for the IP device 110 without the risk of the IP device 110 becoming unreachable to the client device 120 over the local network 130 (as discussed in the preceding paragraph). It may be understood that in the said case, the set static IP address for the IP device 110 is used over the assigned dynamic IP address by the DHCP server 132 therefor as that may be preferred by the client and/or may be easy to remember for the client, e.g., like 192.168.1.123 being set by the client as compared to say 192.168.1.241 being automatically assigned to the IP device 110 (with "123" being easier to remember as compared to "241"). Thereby, if the IP address controller 114 confirms that the set static IP address is valid (i.e., when the static IP address set for the IP device 110 is in the same subnet of the local network 130 as the assigned dynamic IP address by the DHCP server 132 therefor), then the set static IP address is used for the IP device 110 over the assigned dynamic IP address.

On the other hand, the IP address controller 114 is configured to implement the dynamic IP address assigned to the IP device 110, if the dynamic IP address and the static IP address are not in the same subnet of the local network 130. That is, if the static IP address set for the IP device 110 is not in the same subnet of the local network 130 as the assigned dynamic IP address by the DHCP server 132 therefor, then it may be considered that using the set static IP address may cause the IP device 110 to become unreachable to the client device 120 over the local network 130 (as discussed in the preceding paragraphs). It may be understood that in the said case, the assigned dynamic IP address by the DHCP server 132 for the IP device 110 is used over the set static IP address therefor, so as to avoid the risk of the IP device 110 becoming unreachable to the client device 120 over the local network 130. Thereby, if the IP address controller 114 confirms that the set static IP address is not in the same subnet of the local network 130, then the assigned dynamic IP address by the DHCP server 132 is used for the IP device 110 over the set static IP address therefor.

In an embodiment, in case of no assignment of the dynamic IP address for the IP device 110 after completion of the predefined wait time, the boot controller 112 is configured to generate the boot signal with null dynamic IP address information. Further, in such case, the IP address controller 114 is configured to implement the static IP address set for the IP device 110 in response to the boot signal with the null dynamic IP address information. That is, if no dynamic IP address is assigned to the IP device 110 even after completion of the predefined wait time, then it may be considered that the DHCP server 132 may be unresponsive and/or not reachable, and in such case the static IP address (if set) is used anyways without consideration of the static IP address being in the subnet of the local network 130. This is done (i.e., the set static IP address is used in any case) so that the IP device 110 may be provided with at least some IP address therefor, to allow for the IP device 110 to attempt to connect to the local network 130.

Figure 2:
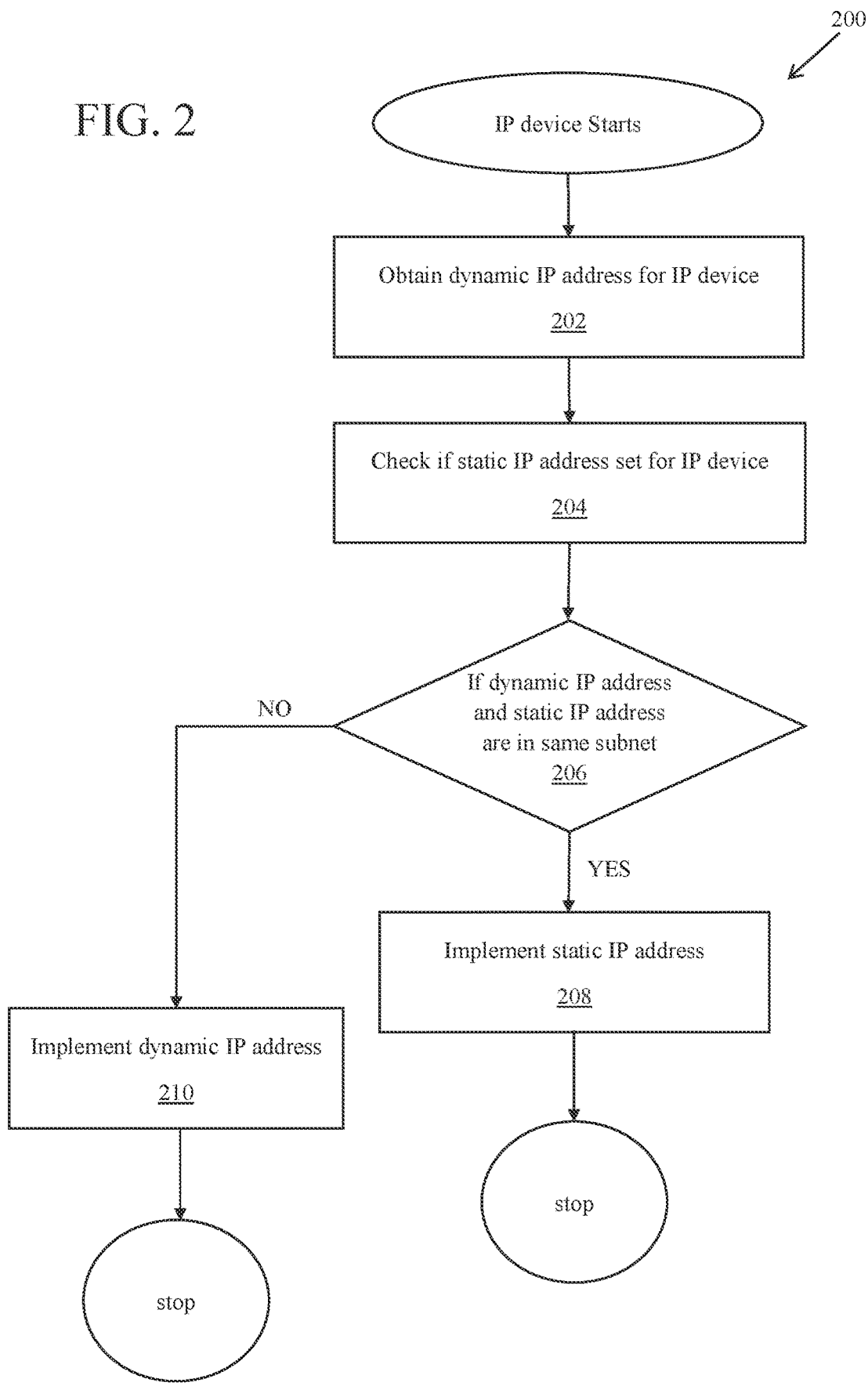
FIG. 2 is a flowchart listing steps involved in a method for configuring an Internet Protocol (IP) device to be discoverable to a client device over a local network, in accordance with an embodiment of the present disclosure.

Referring to FIG. 2, illustrated is a flowchart illustrating steps involved in a method 200 for configuring an Internet Protocol (IP) device (such as, the IP device 110) to be discoverable to a client device (such as, the client device 120) over a local network (such as, the local network 130), in accordance with an embodiment of the present disclosure. As shown, the method 200 comprises the steps 202, 204, 206, 208 and 210. The listed steps 202, 204, 206, 208 and 210 may not necessarily be performed in sequential order.

At step 202, the method 200 comprises obtaining a dynamic IP address assigned to the IP device 110 upon completion of boot process for the IP device 110. Herein, the DHCP server 132 assigns a non-duplicate dynamic IP address to the IP device 110. The DHCP server 132 may automatically allocate an IP address and a subnet address to the IP device 110 using a zero-configuration scheme that enables automatic setting of network configuration for the IP device 110.

At step 204, the method 200 further comprises checking if a static IP address has been set for the IP device 110. In the present non-limiting implementation, the IP address controller 114 is further configured to check if a static IP address has been set for the IP device 110. As discussed, sometimes the client may wish (or need) to set the static IP address for the IP device 110, so that the client knows the IP address of the IP device 110 over the local network 130 at any given instant for reliable connection, such as to be able to easily access the IP device 110 from the client device 120 (for example, by simply entering the set static IP address as URL in a browser of the client device 120 or the like). Therefore, in case, the static IP address has been set for the IP device 110, then the IP address controller 114 fetches the set static IP address therefor.

At step 206, the method 200 further comprises determining if the dynamic IP address and the static IP address are in a same subnet of the local network. In the present non-limiting implementation, the IP address controller 114 is configured to determine if the dynamic IP address and the static IP address are in a same subnet of the local network 130. That is, it is checked whether the set static IP address for the IP device 110 is in the same subnet of the local network 130 as the assigned dynamic IP address thereto. As may be understood, the assigned dynamic IP address may always be in the correct subnet of the local network 130, since it is assigned by the DHCP server 132 of the local network 130; but it may be possible that the set static IP address for the IP device 110 may have been wrongly entered (while manual configuration of the IP device 110 by the client) and may possibly be outside of the subnet of the local network 130. For example, if a valid IP address pool for the local network 130 is 192.168.1.1 to 192.168.1.255, and the static IP address for the IP device 110 may have been set as 192.168.0.123 (while, e.g., the client may have wanted to enter 192.168.1.123 as the static IP address), in such case, the static IP address would be outside of the subnet of the local network 130. Now, if the IP device 110 may have used the wrongly set static IP address, then the IP device 110 would become unreachable to the client device 120 over the local network 130.

At step 208, the method 200 further comprises implementing the static IP address set for the IP device, if the dynamic IP address and the static IP address are in the same subnet of the local network. In the present non-limiting implementation, the IP address controller 114 is configured to implement the static IP address set for the IP device 110, if the dynamic IP address and the static IP address are in the same subnet of the local network 130. That is, if the static IP address set for the IP device 110 is in the same subnet of the local network 130 as the assigned dynamic IP address by the DHCP server 132 therefor, then it may be considered that the set static IP address can be used for the IP device 110 without the risk of the IP device 110 becoming unreachable to the client device 120 over the local network 130 (as discussed in the preceding paragraph). It may be understood that in the said case, the set static IP address for the IP device 110 is used over the assigned dynamic IP address by the DHCP server 132 therefor as that may be preferred by the client and/or may be easy to remember for the client, e.g., like 192.168.1.123 being set by the client as compared to say 192.168.1.241 being automatically assigned to the IP device 110 (with "123" being easier to remember as compared to "241"). Thereby, if the IP address controller 114 confirms that the set static IP address is valid (i.e., when the static IP address set for the IP device 110 is in the same subnet of the local network 130 as the assigned dynamic IP address by the DHCP server 132 therefor), then the set static IP address is used for the IP device 110 over the assigned dynamic IP address.

At step 210, the method 200 comprises implementing the dynamic IP address assigned to the IP device, if the dynamic IP address and the static IP address are not in the same subnet of the local network. In the present non-limiting implementation, the IP address controller 114 is configured to implement the dynamic IP address assigned to the IP device 110, if the dynamic IP address and the static IP address are not in the same subnet of the local network 130. That is, if the static IP address set for the IP device 110 is not in the same subnet of the local network 130 as the assigned dynamic IP address by the DHCP server 132 therefor, then it may be considered that using the set static IP address may cause the IP device 110 to become unreachable to the client device 120 over the local network 130 (as discussed in the preceding paragraphs). It may be understood that in the said case, the assigned dynamic IP address by the DHCP server 132 for the IP device 110 is used over the set static IP address therefor, so as to avoid the risk of the IP device 110 becoming unreachable to the client device 120 over the local network 130. Thereby, if the IP address controller 114 confirms that the set static IP address is not in the same subnet of the local network 130, then the assigned dynamic IP address by the DHCP server 132 is used for the IP device 110 over the set static IP address therefor.

In one or more embodiments, the method 200 further comprises configuring the IP device 110 to enable assignment of the dynamic IP address therefor during the boot process thereof by the DHCP server 132. In the present non-limiting implementation, the boot controller 112 is configured to enable DHCP for the IP device 110 to enable assignment of the dynamic IP address for the IP device 110 during the boot process thereof by the DHCP server 132 over the local network 130. That is, in the present implementation, the dynamic IP address for the IP device 110 is assigned thereto during the boot process itself.

In one or more embodiments, in case of no assignment of the dynamic IP address for the IP device upon completion of the boot process, the method 200 further comprises waiting for a predefined wait time for assignment of the dynamic IP address for the IP device 110 by the DHCP server 132 before completing the boot process. In the present non-limiting implementation, the boot controller 112 is configured to wait for the predefined wait time for assignment of the dynamic IP address for the IP device 110 by the DHCP server 132 before generating the boot signal. That is, if there is no dynamic IP address assigned to the IP device 110 upon completion of the boot process, the boot controller waits for the predefined wait time before confirming completion of the boot process, as in by generation the boot signal. In the present implementation, the predefined wait time varies between 5 seconds to 500 seconds. In an example, the predefined wait time is one of: 5 seconds, 50 seconds, 100 seconds, 200 seconds, 300 seconds, 400 seconds, or 500 seconds. It may be understood that the predefined wait time is utilized to ensure that there is sufficient time given for the DHCP server 132 to allot the dynamic IP address for the IP device 110, such as in case of and compensate for network connectivity issue and/or network congestion issue.

In one or more embodiments, in case of no assignment of the dynamic IP address for the IP device after completion of the predefined wait time, the method 200 further comprises implementing the static IP address set for the IP device 110. In the present non-limiting implementation, the boot controller 112 is configured to generate the boot signal with null dynamic IP address information. Further, in such case, the IP address controller 114 is configured to implement the static IP address set for the IP device 110 in response to the boot signal with the null dynamic IP address information. That is, if no dynamic IP address is assigned to the IP device 110 even after completion of the predefined wait time, then it may be considered that the DHCP server 132 may be unresponsive and/or not reachable, and in such case the static IP address (if set) is used anyways without consideration of the static IP address being in the subnet of the local network 130. This is done (i.e., the set static IP address is used in any case) so that the IP device 110 may be provided with at least some IP address therefor, to allow for the IP device 110 to attempt to connect to the local network 130.

The teachings of the present disclosure provide a workflow to make the IP configuration of the IP device 110 easier and recoverable in extreme cases like when user sets a static IP address which is outside the subnet address and then the IP device 110 becomes unreachable. In the present implementation, when the IP device 110 starts, the Ip device 110 looks for automatic dynamic IP address from the DHCP server 132 on the subnet. If the dynamic IP address and preconfigured static IP address are in same subnet, then the IP device 110 keeps the static IP address. If the static IP address and dynamic IP address don't match, then the IP device 110 keeps the dynamic IP address assigned thereto. This way the client device 120 on the same subnet can always find the IP device 110 (assuming that IP device 110 and client device 120 are on same local network 130).

The system 100 and the method 200 of the disclosure can be implemented in hardware, and in part as firmware or as machine executable computer code in conjunction with hardware that is stored on a non-transitory machine readable medium such as a CD ROM, a RAM, a hard disk, or a magneto-optical disk, diskette, thumbnail drive computer code downloaded over a network originally stored on a remote recording medium or a non-transitory machine readable medium and stored on a local non-transitory recording medium for execution by hardware such as at least one processor having integrated circuitry configured for operation, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc., that may store or receive machine executable code or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, a person skilled in the art understands and appreciates that a "processor", "microprocessor" "controller", or "control unit" constitute hardware in the claimed disclosure that contain circuitry that is configured for operation. Under the broadest reasonable interpretation, the appended claims constitute statutory subject matter in compliance with 35 U.S.C. § 101 and none of the elements are software per se.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for configuring an Internet Protocol (IP) device to be discoverable to a client device over a local network, the local network having a Dynamic Host Configuration Protocol (DHCP) server for assigning dynamic IP addresses, the system comprising:
    a boot controller for the IP device, the boot controller configured to generate a boot signal upon completion of boot process for the IP device; and
    an IP address controller for the IP device, the IP address controller configured to:
        obtain a dynamic IP address assigned to the IP device by the DHCP server, in response to the boot signal from the boot controller;
        check if a static IP address has been set for the IP device;
        determine if the dynamic IP address and the static IP address are in a same subnet of the local network;
        implement the static IP address set for the IP device, if the dynamic IP address and the static IP address are in the same subnet of the local network; and
        implement the dynamic IP address assigned to the IP device, if the dynamic IP address and the static IP address are not in the same subnet of the local network.

2. The system according to claim 1, wherein the boot controller is configured to enable DHCP for the IP device to enable assignment of the dynamic IP address for the IP device during the boot process thereof by the DHCP server.

3. The system according to claim 2, wherein in case of no assignment of the dynamic IP address for the IP device upon completion of the boot process, the boot controller is configured to wait for a predefined wait time for assignment of the dynamic IP address for the IP device by the DHCP server before generating the boot signal.

4. The system according to claim 3, wherein the predefined wait time varies between 5 seconds to 500 seconds.

5. The system according to claim 3, wherein in case of no assignment of the dynamic IP address for the IP device after completion of the predefined wait time, the boot controller is configured to generate the boot signal with null dynamic IP address information, and wherein the IP address controller is configured to implement the static IP address set for the IP device in response to the boot signal with the null dynamic IP address information.

6. The system according claim 1, wherein the IP device is an IP camera.

7. The system according to claim 1, wherein the local network implements TCP/IP communication protocol.

8. The system according to claim 1, wherein the local network implements UDP/IP communication protocol.

9. The system according to claim 1, wherein the local network is a wired network, a wireless network, or a combination thereof.

10. The system according to claim 1, wherein the local network is a local area network (LAN) or a wide area network (WAN).

11. A method for configuring an Internet Protocol (IP) device to be discoverable to a client device over a local network, the local network having a Dynamic Host Configuration Protocol (DHCP) server for assigning dynamic IP addresses, the method comprising:
    obtaining a dynamic IP address assigned to the IP device upon completion of boot process for the IP device;
    checking if a static IP address has been set for the IP device;
    determining if the dynamic IP address and the static IP address are in a same subnet of the local network;
    implementing the static IP address set for the IP device, if the dynamic IP address and the static IP address are in the same subnet of the local network; and
    implementing the dynamic IP address assigned to the IP device, if the dynamic IP address and the static IP address are not in the same subnet of the local network.

12. The method according to claim 11 further comprising configuring the IP device to enable assignment of the dynamic IP address therefor during the boot process thereof by the DHCP server.

13. The method according to claim 12, wherein in case of no assignment of the dynamic IP address for the IP device upon completion of the boot process, the method further comprises waiting for a predefined wait time for assignment of the dynamic IP address for the IP device by the DHCP server before completing the boot process.

14. The method according to claim 13, wherein the predefined wait time varies between 5 seconds to 500 seconds.

15. The method according to claim 13, wherein in case of no assignment of the dynamic IP address for the IP device after completion of the predefined wait time, the method further comprises implementing the static IP address set for the IP device.

16. An Internet Protocol (IP) device configured to be discoverable to a client device over a local network, the local network having a Dynamic Host Configuration Protocol (DHCP) server for assigning dynamic IP addresses, the IP device comprising:
    a boot controller configured to generate a boot signal upon completion of boot process for the IP device; and
    an IP address controller configured to:
        obtain a dynamic IP address assigned to the IP device by the DHCP server, in response to the boot signal from the boot controller;
        check if a static IP address has been set for the IP device;
        determine if the dynamic IP address and the static IP address are in a same subnet of the local network;
        implement the static IP address set for the IP device, if the dynamic IP address and the static IP address are in the same subnet of the local network; and
        implement the dynamic IP address assigned to the IP device, if the dynamic IP address and the static IP address are not in the same subnet of the local network.

17. The IP device according to claim 16, wherein the boot controller is configured to enable DHCP for the IP device to enable assignment of the dynamic IP address for the IP device during the boot process thereof by the DHCP server.

18. The IP device according to claim 17, wherein in case of no assignment of the dynamic IP address for the IP device upon completion of the boot process, the boot controller is configured to wait for a predefined wait time for assignment of the dynamic IP address for the IP device by the DHCP server before generating the boot signal.

19. The IP device according to claim 18, wherein in case of no assignment of the dynamic IP address for the IP device after completion of the predefined wait time, the boot controller is configured to generate the boot signal with null dynamic IP address information, and wherein the IP address controller is configured to implement the static IP address set for the IP device in response to the boot signal with the null dynamic IP address information.

20. The IP device according to claim 16, wherein the IP device is an IP camera.

\* \* \* \* \*